US011871251B2

United States Patent
Sana et al.

(10) Patent No.: US 11,871,251 B2
(45) Date of Patent: Jan. 9, 2024

(54) METHOD OF ASSOCIATION OF USER EQUIPMENT IN A CELLULAR NETWORK ACCORDING TO A TRANSFERABLE ASSOCIATION POLICY

(71) Applicant: COMMISSARIAT A L'ENERGIE ATOMIQUE ET AUX ENERGIES ALTERNATIVES, Paris (FR)

(72) Inventors: Mohamed Sana, Grenoble (FR); Nicola Di Pietro, Grenoble (FR); Emilio Calvanese Strinati, Grenoble (FR); Benoît Miscopein, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 37 days.

(21) Appl. No.: 17/449,337

(22) Filed: Sep. 29, 2021

(65) Prior Publication Data
US 2022/0104034 A1     Mar. 31, 2022

(30) Foreign Application Priority Data
Sep. 30, 2020   (FR) .................................... 20 09989

(51) Int. Cl.
*H04W 24/02*    (2009.01)
*G06N 3/04*     (2023.01)
(Continued)

(52) U.S. Cl.
CPC .............. *H04W 24/02* (2013.01); *G06N 3/04* (2013.01); *G06N 3/08* (2013.01); *H04L 5/006* (2013.01);
(Continued)

(58) Field of Classification Search
CPC ..... H04W 48/00; H04W 48/20; H04W 60/00; H04W 76/10; H04W 76/11
See application file for complete search history.

(56) References Cited

U.S. PATENT DOCUMENTS

2009/0238114 A1*  9/2009  Deshpande ....... H04W 36/0061
                                                           370/328
2016/0323900 A1   11/2016  De Domenico et al.

FOREIGN PATENT DOCUMENTS

WO    WO-2020237030 A1 *  11/2020  ............ H04W 24/02

OTHER PUBLICATIONS

M. Sana, A. De Domenico and E. Calvanese Strinati, "Multi-Agent Deep Reinforcement Learning Based User Association for Dense mmWave Networks," 2019 IEEE Global Communications Conference (GLOBECOM), Waikoloa, HI, USA, 2019, pp. 1-6, doi: 10.1109/GLOBECOM38437.2019.9013751. (Year: 2019).*
French Preliminary Search Report dated Jun. 11, 2021 in French Application 20 09989 filed on Sep. 30, 2020, 2 pages (with English Translation of Categories of Cited Documents).
Zhao et al., "Deep Reinforcement Learning for User Association and Resource Allocation in Heterogeneous Networks", IEEE, Dec. 9, 2018, 6 pages, XP033519773.
Ye et al., "User Association for Load Balancing in Heterogeneous Cellular Networks", IEEE Transactions on Wireless Communications, vol. 12, No. 6, Jun. 1, 2013, 11 pages, XP011516550.

*Primary Examiner* — Kevin Kim
(74) *Attorney, Agent, or Firm* — Oblon, McClelland, Maier & Neustadt, L.L.P.

(57) ABSTRACT

A method for associating user equipment with base stations of a cellular network, in particular of a heterogeneous network such as a 5G network, uses a multi-agent reinforcement learning (MARL) algorithm. When a user equipment enters the network, the agent associated with this equipment downloads the instance of an association meta model to a coordinating unit, pre-trained by means of reinforcement learning. The agent subsequently constructs a local observation vector, comprising observables relating to the user equipment, and a global observation vector, including observables relating to the environment of this equipment. The local and global observation vectors are projected into the same reference space, the concatenation of the vectors thus projected encoding the state of the agent. It deduces (Continued)

from the model and from this state, an association decision. The model is updated according to a policy gradient method to consider evolution of the environment of the user.

12 Claims, 4 Drawing Sheets

(51) Int. Cl.
  G06N 3/08 (2023.01)
  H04L 5/00 (2006.01)
(52) U.S. Cl.
  CPC .......... *H04L 5/0048* (2013.01); *H04L 5/0055* (2013.01); *H04L 5/0078* (2013.01)

(56) References Cited

OTHER PUBLICATIONS

Watkins et al., "Q-Learning", Machine Learning, vol. 8, No. 3-4, 1992, pp. 279-292.
Vaswani et al., "Attention Is All You Need", 31$^{st}$ Conference on Neural Information Processing Systems (NIPS 2017), 2017, 11 pages.
Sutton et al., "Reinforcement Learning", Chapter 13: Policy Gradient Methods, 2018, 16 pages.
Schulman et al., "High-Dimensional Continuous Control Using Generalized Advantage Estimation", ICLR, 2016, 14 pages.

* cited by examiner

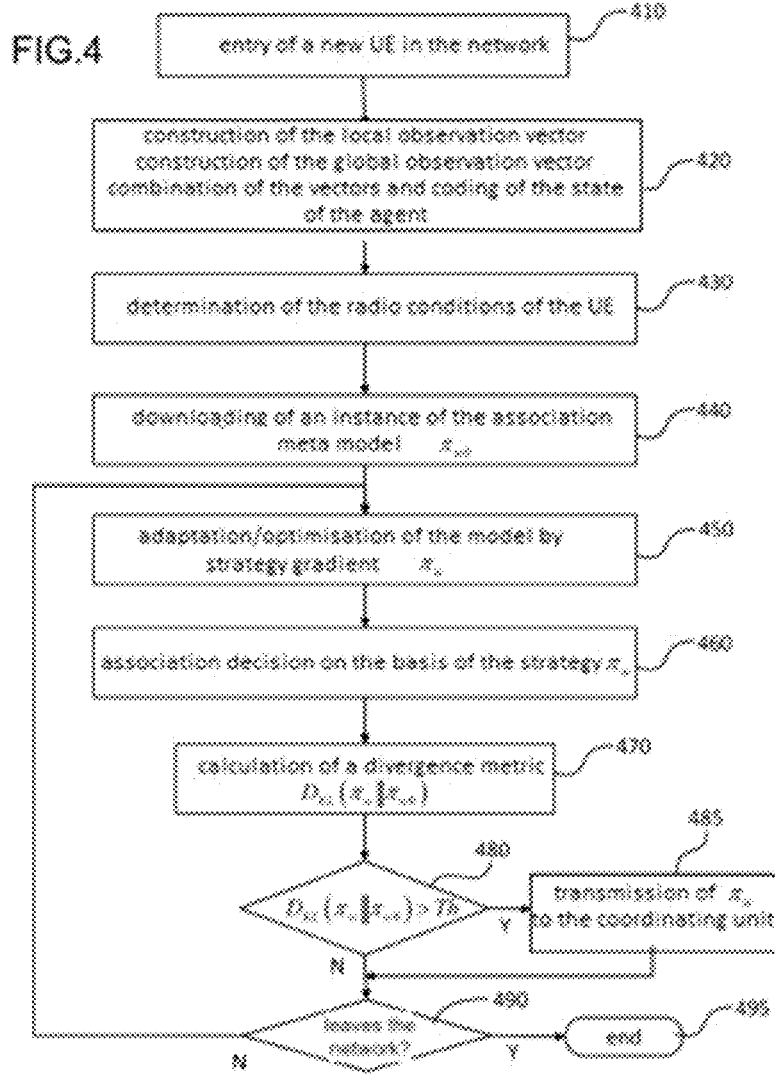

METHOD OF ASSOCIATION OF USER EQUIPMENT IN A CELLULAR NETWORK ACCORDING TO A TRANSFERABLE ASSOCIATION POLICY

TECHNICAL FIELD

The present invention relates to the field of cellular networks and more particularly the association of user equipment (UE) with base stations in a heterogeneous network such as those of the fifth generation (5G). It also relates to the field of artificial intelligence and more particularly that of Multi-Agent Reinforcement Learning or MARL.

PRIOR ART

The methods for associating mobile terminals or UE (User Equipment) with the base stations of a cellular network have been the subject of vast research over the last twenty years. Generally, an association method aims to determine, for each mobile terminal, the base station (in other words the cell) that will have to serve it, given the needs of all of the users (throughput, signal-to-noise ratio, latency, etc.) and the constraints relating to the base stations (maximum emission power, level of interference, available bandwidth, etc.). A wide diversity of association methods has been proposed in the prior art, according to the target function to be achieved and the constraints to be met.

With the deployment of $5^{th}$ generation cellular networks, the association techniques must evolve to face new challenges. Indeed, many of the 5G networks are heterogeneous by nature. An example of heterogeneous network, envisaged within the scope of 5G, involves the superposition of a dense layer of small cells or SBS (Small cell Base Stations) operating particularly in the millimetre band, intended to ensure coverage over a short distance and at high throughput, and of a not very dense layer of macrocells or MBS (Macro cell Base Stations), operating in the sub-6 GHz band, intended to ensure continuous coverage. The small cells have a large number of transmission resources whether in terms of spectral resources or spatial resources (formation of directional beams). Furthermore, the association of a mobile terminal with a base station (SBS or MBS) requires taking into account the load of the various base stations, the levels of interference, the throughputs of the various users, the possible configurations of beams, etc. As a result, the optimisation of the overall performance of the network becomes particularly complex. It can be shown that the search for the optimal association is in fact a combinatorial problem, the complexity of which is of the NP class, in other words, having a complexity that changes exponentially with the number of entities (users, base stations) in the network.

A method for associating mobile terminals with base stations of a heterogeneous network was described in the article by N. Zhao and al. entitled "Deep reinforcement learning for user association and resource allocation in heterogeneous networks" published in Proc. of IEEE Global Communications Conference (GLOBECOM), pp. 1-6, 2018. This association method uses a reinforcement learning method known by the name of Q-learning. A description of this method can be found in the article by C. Watkins and al. entitled "Q-learning" published in the review Machine Learning, vol. 8, No. 3-4, pp. 279-292, 1992. It is reminded that a reinforcement learning method is an automatic learning method wherein an autonomous agent, immersed in an environment, learns actions to be carried out from experiments, in such a way as to optimise a reward accumulated over time. The agent makes decisions depending on the environment and the latter provides it with rewards depending on the actions that it carries out. In the aforementioned article, the association method is of the multi-agent type, each user equipment acting as an agent and learning from its environment, the various agents operating cooperatively. Nevertheless, this association method uses a space of states representing the satisfaction (or absence of satisfaction) of a minimum quality of service (QoS) ($\Omega_r$) for each of the users of the network, each user moreover being informed of the satisfaction or not of the qualities of service required by the other users. This type of cooperation assumes the exchange of a significant number of messages (message passing) between the mobile terminals via control channels and thus the mobilisation of transmission resources for this purpose. Furthermore, the determination of the association policy assumes the use of a DDQN neural network (Double Deep Q-network), the size of the input variables of which increases with the number of users. As a result, the association method proposed is not scalable with the number of users in the network.

Furthermore, the change in position, the departure or the arrival of a user in a cell is likely to modify the optimal association of the network. In the method proposed by N. Zhao et al., whenever a user rejoins or leaves a cell, a modification of the architecture of the neural network of each of the users and a new learning phase are necessary and this, for each of them. Indeed, each user must relearn their own association policy. In particular, the association policy developed during a preceding reinforcement learning phase is not transferable to a new scenario of the network (for example, arrival or departure of a user of a cell, change of available resources by station).

One object of the present invention is consequently to propose a method for associating user equipment with base stations of a cellular network, in particular a heterogeneous network such as a 5G network, implementing a multi-agent reinforcement learning algorithm making it possible to construct an association policy which is both adaptive and transferable to a new scenario of the network, particularly when a new user arrives in or leaves a cell.

DESCRIPTION OF THE INVENTION

The present invention is defined by a method for associating user equipment (UE) with base stations of a cellular network, said association method implementing a multi-agent reinforcement learning method, each user equipment being represented by an agent, wherein:

when a user equipment $u_j$ enters the network, the agent representing this user equipment downloads an instance of a meta model ($\pi_{w_0}$) to initialise an association strategy model ($\pi_{w,j}$), said meta model having an architecture independent of the user;

the agent representing the user equipment $u_j$ constructs a local observation vector ($o^l_j(t)$) comprising observables relating to this equipment and a global observation vector ($o^g_j(t)$) comprising observables relating to an environment of this equipment;

the agent associated with the user equipment $u_j$ projects the local observation vector and the global observation vector into the same reference space and combines the two vectors thus projected to provide a code ($c_j(t)$) of the state ($s_j(t)$ of the agent;

the agent associated with the user equipment $u_j$ updates the association strategy model by means of a policy gradient method;

the agent associated with the user equipment $u_j$ decides on the base station with which to associate and receives in return a common reward calculated from a utility function of the network.

Typically, the association strategy $\pi_{w,j}(a|s)$ gives the probability of taking the action $_a$ when the agent is in the state $_s$, the action $_a$ corresponding to an association with a base station of the network.

The local observation vector, $o^l_j(t)$, of the user $u_j$, at the time t may comprise the association decision of the agent at the preceding time, $a_j(t-1)$, in order to request the association of the user equipment with a base station, the response of the base station to this request, $ACK_j(t-1)$, the throughput required by the mobile terminal at the time t, $D_j(t)$, as well as an estimation of the capacity of the downlink of this base station with $u_j$ at the preceding time t−1, $R_j(t-1)$.

The global observation vector, $o^g_j(t)$, may comprise, for its part, the coordinates of the user equipment located in the neighbourhood $V_j$ of $u_j$, as well as the respective capacities of the downlinks between these user equipment and the base stations with which they are associated.

Advantageously, the global observation vector is projected into a reference space by means of an attention mechanism calculating for each contribution of a user $u_i \in V_j$ to the global observation vector, a key vector, $k_i$ a query vector, $q_i$, and a value vector, $v_i$, and that it is calculated for each user $u_i \in V_j$ an attention score $\alpha_{i,j}$ between this user and the user $u_j$, from the scalar product of the query vector of $u_i$ and of the key vector of $u_j$, the projected global observation vector being obtained as the linear combination of the respective value vectors, $v_i$, of the user equipment $u_i \in V_j$ weighted with their corresponding attention scores, $\alpha_{i,j}$, the projection of the local and global observation vectors, their combination as well as the obtaining of the probabilities of association $\pi_{w,j}(a|s)$ with the various base stations of the network being performed by means of an artificial neural network initially configured from said instance of the meta model.

The local observation vector may subsequently be projected into the same reference space and the local and global observation vectors are combined by a self-attention mechanism to provide the code $(c_j(t))$ of the state $(s_j(t))$ of the agent.

Advantageously, the association strategy, $\pi_{w,j}(a|s)$ is configured by a set of parameters represented by a vector w, the said vector being updated iteratively by $w_{t+1} = w_t + \mu \hat{p}_t$ where $\mu$ is the learning rate, and $\hat{p}_t = E(\nabla \zeta(w_t) \hat{A}_t(\alpha_j|s_j))$ where $$\zeta(t) = \frac{\pi_{w_t}(a_j \mid s_j)}{\pi_{w_{t-1}}(a_j \mid s_j)}$$

is the ratio between the distribution of probability of taking the action $a_j$ in the state $s_j$ at the time t and the distribution of this same probability at the preceding time t−1, $\hat{A}_t(a_j|s_j)$ being the advantage function of the action $a_j$ in the state $s_j$ at the time t.

Alternatively, the association strategy, $\pi_{w,j}(60\ |S)$ is configured by a set of parameters represented by a vector w, the said vector being updated iteratively by $w_{t+1} = w_t + \mu \hat{p}_t$ where $\mu$ is the learning rate, and $$\hat{p}_t = E(\nabla(\min(\zeta(w_t) \hat{A}_t(a_j|s_j), \text{clip}\ (\zeta(w_t), 1-\varepsilon_1, 1-\varepsilon_2) \hat{A}_t(a_j|s_j))))$$

with $\text{clip}(x,a,b) = \min(\max(x,a),b)$ and $0 < \varepsilon_1 < \varepsilon_2 < 1$, and where $$\zeta(t) = \frac{\pi_{w_t}(a_j \mid s_j)}{\pi_{w_{t-1}}(a_j \mid s_j)}$$

is the ratio between the distribution of probability of taking the action $a_j$ in the state $s_j$ at the time t and the distribution of this same probability at the preceding time t−1, $\hat{A}_t(a_j|s_j)$ being the advantage function of the action $a_j$ in the state $s_j$ at the time t.

Advantageously, a Kullback-Leibler divergence metric, $D_{KL}(\pi_w \| \pi_{w0})$ may be calculated between the probability distribution, $\pi_{w0}$, relating to the association strategy of the meta model and that, $\pi_{w0}$, relating to the strategy resulting from the updated module, the agent representing the user equipment transmitting to the coordinating unit the parameters of the updated model if this metric is greater in absolute value than a predetermined threshold.

According to a first variant, the agents representing the user equipment reside in the coordinating unit, the equipment transmitting to the coordinating unit their local observation, $o^l_j(t)$, and global observation, $o^g_j(t)$, vectors and the association decisions of the various agents being transmitted by the coordinating unit to the latter.

According to a second variant, the agents representing the user equipment reside in the coordinating unit, the equipment transmitting to the coordinating unit their local observation vectors, $o^l_j(t)$, accompanied by their key, query and value weight vectors $k_j, q_j, v_j$ the association decisions of the various agents being transmitted by the coordinating unit to the latter.

According to a third variant, the user equipment exchange between neighbours their key, query and value weight vectors $k_j, q_j, v_j$, the agents representing the various user equipment residing in these equipment and making the association decisions.

BRIEF DESCRIPTION OF THE DRAWINGS

Other features and advantages of the invention will become apparent upon reading a preferable embodiment of the invention, described with reference to the appended figures, wherein:

FIG. 4 represents in flow chart form an example of implementation of the association method in a cellular network.

DETAILED DESCRIPTION OF SPECIFIC EMBODIMENTS

It will be considered in the following a cellular network consisting of a plurality of base stations. Without loss of generality and by way of illustration only, we will assume that this cellular network is heterogeneous. Heterogeneous cellular network means a network resulting from the superposition of a layer of small cells (SBS) of low coverage, but potentially capable of offering each UE a high throughput, and of a layer of macrocells (MBS), guaranteeing the continuity of the coverage of the network by offering a greater range. A typical example of application is that of a 5G network wherein the SBS cells operate in the millimetre band and the MBS cells operate in the sub-6 GHz band. The person skilled in the art will nevertheless understand that the association method according to the present invention applies to any cellular network, regardless of whether it is homogeneous or heterogeneous.

Figure 1:
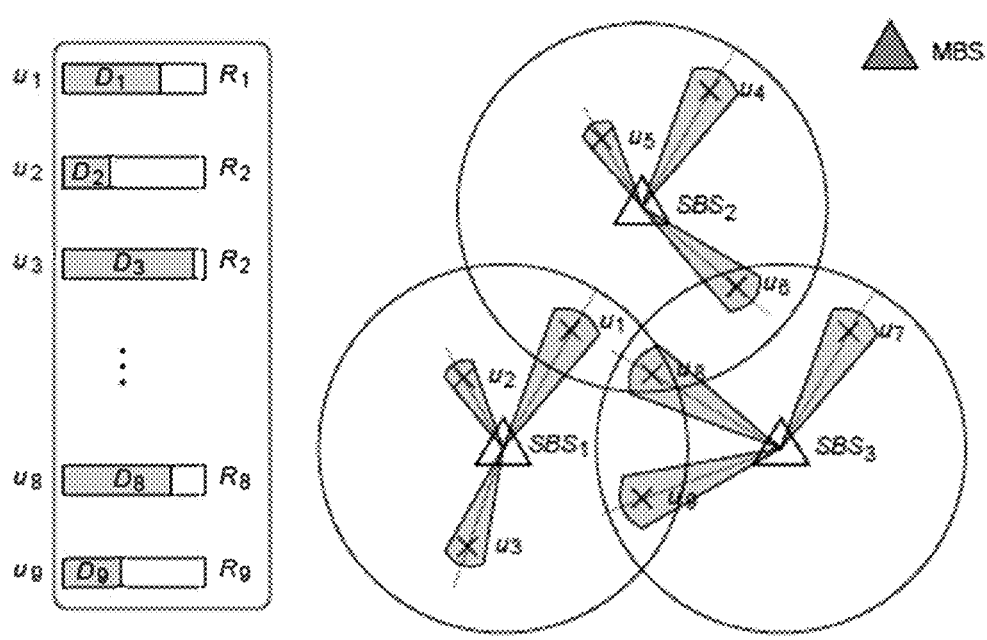
FIG. 1 schematically represents a situation for associating user equipment with base stations in a heterogeneous network.

FIG. 1 represents an example of association of user equipment (UE) with base stations in such a heterogeneous network.

$u_1, \ldots, u_8$ denotes the user equipment (for example mobile terminals), $SBS_1, SBS_2, SBS_3$ the base stations of three small cells and MBS the base station of a macrocell.

At a given time t, each user equipment $u_j$ requires a certain throughput $D_j(t)$ to meet a quality of service (QoS) constraint. The association of this terminal with a base station $BS_i$ (conventionally $BS_0$ will denote the MBS station and $BS_i$, $i=1, \ldots, N_s$ the $N_s$ SBS base stations) is considered satisfactory if the capacity $R_{ij}$ of the channel, given by the Shannon formula $R_{ij}=B_{ij}\log(1+SINR_{ij})$ is such that $R_{ij} \geq D_j$ where $B_{ij}$ and $SINR_{ij}$ are respectively the bandwidth and the signal-to-interference-plus-noise ratio relating to the channel. The interference to take into account here is the interference due to other communications within the same cell (intracellular interference) as well as that due to communications of other cells (intercellular interference).

For each base station $BS_i$, $U_i$ denotes all of the user equipment that are located in the coverage of $BS_i$. Thus in the example illustrated, $U_0=\{u_1, \ldots, u_9\}$, $U_1=\{u_1, u_2, u_3, u_8, u_9\}$, $U_2=\{u_1, u_4, u_5, u_6, u_8\}$ and $U_3=\{u_6, u_7, u_8, u_9\}$. Reciprocally, for a given user equipment $u_j$, $S_j$ denotes all of the base stations likely to serve it. Thus, in the example illustrated $S_1=\{BS_0, BS_1, BS_2\}$, $S_5=\{BS_0, BS_2\}$, and $S_s=\{BS_0, BS_1, BS_2, BS_3\}$.

It is sought to associate the user equipment with base stations in such a way as to maximise a utility function, $U(t)$, on the entire network whilst respecting a certain number of constraints concerning the transmission resources available for the base stations. If it is indicated by $X_{ij}=1$ the association of the user equipment $u_j$ with the base station $BS_i$ and, $x_{ij}=0$ the absence of association, and if it is assumed that a user equipment can only associate with a single base station, the association sought is obtained by resolving the optimisation problem:

$$\max_{x_{ij}} U(t) \qquad (1\text{-}1)$$

by respecting the constraints:

$$x_{ij} = \{0, 1\} \qquad (1\text{-}2)$$

$$\sum_{u_j \in U_i} x_{ij} \leq N_i, \forall BS_i, i = 0, \ldots, N_s \qquad (1\text{-}3)$$

$$\sum_{BS_i \in S_j} x_{ij} = 1, \forall u_j, j = 1, \ldots, N_u \qquad (1\text{-}4)$$

where $N_i$ is the maximum number of user equipment that the base station $BS_i$ may support simultaneously (this may particularly correspond to the number of available transmission resources, for example the number of distinct transmission beams that the station has), $N_s$ is the number of SBS and $N_u$ is the number of user equipment. The constraint (1-3) simply translates the fact that the user equipment may only be served by a base station up to the maximum number of permissible user equipment, the constraint (1-4) that each user equipment must be served by one base station. In practice, the quantity of resources of the MBS base station ($BS_0$)) being substantially higher than those of the BS base stations ($BS_i$, $i=1, \ldots, N_s$), the constraint will nearly always be satisfied for i=0. Ideally, the throughput requests of the various users must be respected and in this case:

$$D_j \leq \sum_{BS_i \in S_j} x_{ij} R_{ij} \qquad (1\text{-}5)$$

The utility function of the network may be chosen as the total capacity that may be offered to the various users, i.e.:

$$U(t) = \sum_{i,j} x_{ij} R_{ij} \qquad (2\text{-}1)$$

if necessary, by taking into account throughput requests of the users:

$$U(t) = \sum_{i,j} x_{ij} \min(D_j, R_{ij}) \qquad (2\text{-}2)$$

or even by involving non-linear, for example, logarithmic, functions of the throughputs to guarantee a certain fairness between the various users (to reduce the disparity that there may be between them on the basis of their perceived throughputs):

$$U(t) = \sum_{i,j} x_{ij} \log_2(R_{ij}) \qquad (2\text{-}3)$$

Other utility functions of the network may be envisaged by the person skilled in the art (for example by taking into account xMBB, uMTC and mMTC types of service required by the various users). Generally, the utility function of the network is representative of a quality of service offered to users of the network, particularly in terms of capacity and/or of latency.

The idea at the basis of the invention is to develop an association policy common to all of the users by means of a reinforcement learning method, each user entering the network using this common policy to transmit their association requests, then adapting their association policy over time depending on the evolution of their environment.

Figure 2:
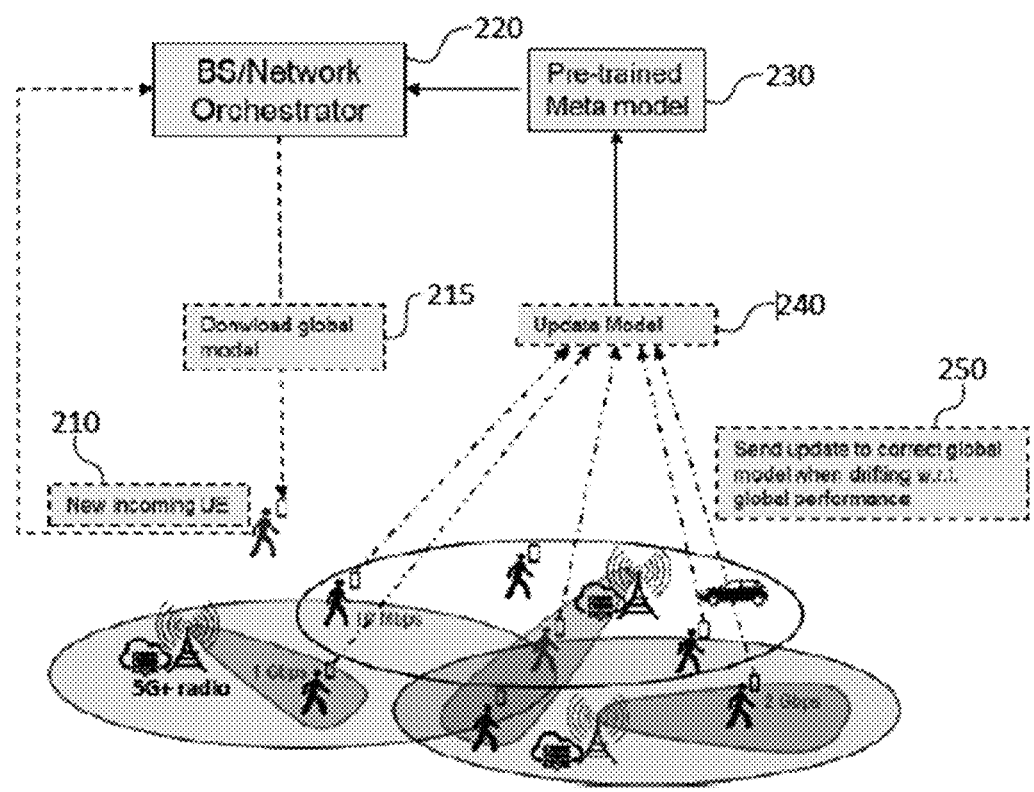
FIG. 2 schematically illustrates the operating principle of the association method according to the present invention.

The operating principle of the association method according to the present invention is illustrated in FIG. 2.

When a new user, 210, enters the network, they download in 215 to a coordinating unit, 220, a common (or global) model giving the common association policy, this common model being obtained as instance of a meta model, 230, pre-trained during a reinforcement learning phase.

Alternatively, the meta model may be downloaded from a cache memory of a base station that will itself be downloaded beforehand.

This global model defined by its set of parameters, noted synoptically, w, makes it possible for the new user to decide, from a local observation vector and from a global observation vector, with which base station it will associate. The architecture of the meta model and the set of parameters are by definition independent of the user.

Each user of the network may subsequently evolve in 240 their model independently depending on variations in their environment. The users may subsequently send, in 250, the parameters of their respective models to the coordinating unit in order to update the meta model federatively.

More specifically, it is defined for each user equipment $u_j$, a local observation vector, $o^l_j(t)$, representing a knowledge of its local environment at the time $_t$. Local observation means a set of observables specific to this user.

It may thus be possible to choose as local observation vector:

$$o^l_j(t)=(a_j(t-1), ACK_j(t-1), RSSI_j(t), D_j(t), R_j(t-1)) \quad (3)$$

where $a_j(t-1)$ is the action having been carried out by the user $u_j$ at the preceding time, that is to say the association request emitted, $ACK_j(t-1)$ is the response to this association request, sent back by the base station to which it has been transmitted (for example $ACK_j(t-1)=1$ if the association is accepted $ACK_j(t-1)=0$ if the association is denied), $RSSI_j(t)$ is the measurement at the time $_t$ of the power received from the base station with which the mobile terminal (UE) is associated, $D_j(t)$ is the throughput requested by the mobile terminal at the time $_t$, $R_j(t-1)$ is an estimation of the channel capacity of the downlink at the preceding time t−1 (in other words, $R_j(t-1)=B_{ij}(t-1)\log_2(1+SINR_{ij}(t-1))$ where $B_{ij}(t-1)$ and $SINR_{ij}(t-1)$ are respectively the bandwidth and the signal-to-interference-plus-noise ratio at the preceding time, t−1).

If necessary, the local observation vector may also comprise the value of the total capacity of the network R(t−1) at the preceding time, t−1. The observation vector does not however lose for all that its local character so long as this information is available locally at the time, $^t$.

It should be noted that certain components of the local observation vector $o^l_j(t)$ are optional. Thus, for example, if it is not necessary to take into account the current throughput request of the user (service corresponding to a Best Effort category), the component $D_j(t)$ may be omitted.

Conversely, it may be possible to include in the local observation vector, supplementary components such as, for example, an estimation of the arrival angles of the beams of the various base stations $BS_i \in S_j$.

The action of a user equipment at the time $_t$ is defined by the association request of this user, i.e. $a_j(t)=i$ where $BS_i \in S_j$. This action is decided by the user according to a strategy $\pi_j$ that will be explained further.

Each user $u_j$ is also associated with a global observation vector, $o^g_j(t)$, at the time $_t$. Global observation means a set of observables relating to user equipment located in the neighbourhood $V_j$ of the user $u_j$. The neighbourhood of the user $u_j$ may be defined geometrically (user equipment belonging to a disk of predetermined radius around $u_j$) or from a reception level (signal level received greater than a predetermined threshold).

In any case, it may thus be possible to choose as global observation vector:

$$o^g_j(t)=(\{(x_k, y_k; R_k(t))|u_k \in V_j\}) tm \quad (4)$$

where $(x_k, y_k)$ are the coordinates of the equipment $u_k$ located in the neighbourhood $V_j$ and $R_k(t)$ is the capacity of the downlink between the base station $BS_{a(k)}$ associated with the equipment $u_k$ and this equipment.

It will be noted $o_j(t)=(o^l_j(t), o^g_j(t))$ the composite observation vector resulting from the concatenation of the local observation vector and of the global observation vector of the user $u_j$. At each time t, the vector $o_j(t)$ represents a partial observation of the state, $s_j(t)$, of the environment of the user $u_j$.

After the agent associated with the user $u_j$ has observed the vector $o_j(t)$ and decided an action $a_j(t)$ (that is to say has requested an association with a base station), it receives a reward that is not specific to the equipment of the user in question but common to all of the users. More specifically, it is chosen equal to the utility function defined above $r_j(t)=r(t)=U(t)$.

The resulting experiment of the agent associated with the user at the time $_t$ is defined by the quadruplet:

$$e_j(t)=(o_j(t), a_j(t), r(t), o_j(t+1)) \quad (5)$$

The successive experiments are stored in a memory, for example in a local memory of the equipment of the user to make it possible to stabilise the replay memory learning process.

Each agent representing (that is to say associated with) a user follows a strategy or policy aiming to maximise the sum of rewards over time, each reward being assigned an update factor γ determining the weight of the future rewards in the choice of the action at the time $_t$. A policy is a function that gives for each state the probabilities of selecting the various possible actions.

In practice, for a sequence (or episode) of finite duration T, each agent representing a $u_j$ follows a strategy $\pi_j$ to maximise at each time $_t$ the sum of updated rewards:

$$G_j(t) = \sum_{\tau=1}^{T} \gamma^{\tau-1} r_j(t+\tau) \quad (6)$$

where $r_j(t)=U(t)$ is in the present case the common reward equal to the aforementioned utility function.

As we will see further, the strategy followed by the user is initialised when they enter the network by a policy $\pi_w$ defined by the meta model stored in the coordinating unit. This strategy may subsequently evolve independently depending on the environment of each user. It is then noted $\pi_{w,j}$.

Figure 3:
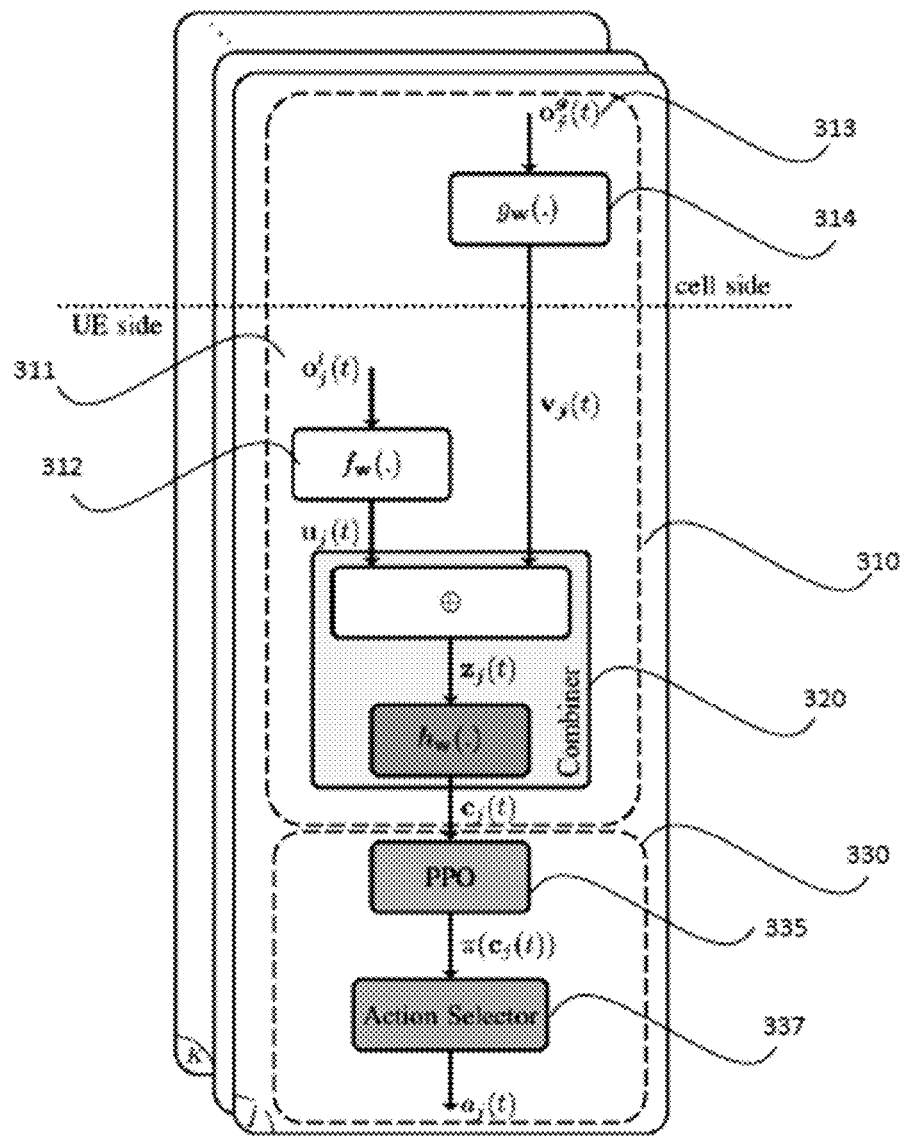
FIG. 3 schematically represents the manner in which the association of a user equipment with a base station is decided, according to one embodiment of the invention.

FIG. 3 schematically represents the manner in which an agent decides the association of a user equipment with a base station.

The association method includes two phases.

In a first phase, 310, the state of the environment of the user is coded from its local observation vector and its global observation vector.

In a second phase, 330, the agent chooses the action $a_j(t)$ to be carried out, in other words the base station with which the equipment must be associated, from the previously encoded internal state.

In the first phase, in 311 a local observation vector, $o^l_j(t)$, is formed from observables specific to the user, for example according to the expression (3). Similarly, in 313 a global observation vector is formed, $o^g_j(t)$, from observables relating to equipment located in the neighbourhood $V_j$ of the equipment of this user, for example according to the expression (4).

Unlike the local observation vector, the size of the global observation vector is variable. Indeed, it varies with the number of user equipment present in the neighbourhood, $N_j$=card($V_j$). Furthermore, for confidentiality reasons, it may be desirable that a user equipment does not access the position information of its various neighbours.

For these reasons, local observation and global observation vectors projected into the same reference space are calculated.

More specifically, in 312 a first projection function $f_w$: $\mathbb{R}^l \to z, 40^n$ is applied where l is the dimension of the local observation vector and n is the dimension of the reference space of fixed dimension (particularly independent of the user), to obtain a projected local observation vector $u_j(t)=f_w(o^l_j(t))$.

Similarly, in 314, a second projection function $g_w$: $\mathbb{R}^{mN_j} \to \mathbb{R}^n$ is applied where $m.N_j$ is the dimension of the global observation vector (it will be noted that m=3 in the case of the expression (4)), to obtain a projected global observation vector, $v_j(t)=g_w(o^g_j(t))$.

Advantageously, in order to have a transferable neural network architecture as will be seen further, the projection function is chosen independent of the number of users located in the neighbourhood of the user $u_j$, in other words independent of the size of the vector of $o^g_j(t)$. Indeed, it varies depending on the user and is required to change over time (particularly in the case of a mobile network). Thus, in order to obtain a transferable architecture, the projection function may be constructed from an attention mechanism such as defined in the article by A. Vaswani and al. entitled "Attention is all you need", published in Proceedings of NIPS 2017, 6.12.2017.

The attention mechanism was initially introduced in the field of natural language processing, and particularly translation, in order to process sequences of words of any length without resorting to convolutive recurrent complex neural networks.

In the present case, each equipment, $u_i \in V_j$, calculates its own contribution to the global observation vector $\delta^g_i(t)=(\{(x_i,y_i;R(t))\})$ and deduces therefrom the key, query and value vectors as follows:

$$k_i = \delta^g_i W_k \quad (7\text{-}1)$$

$$q_i = \delta^g_i W_q \quad (7\text{-}2)$$

$$v_i = \delta^g_i W_v \quad (7\text{-}3)$$

where $w_k, w_q, w_v$ are matrices of size 3×n, and $k_i, q_i, v_i$ are respectively the key, query and value vectors of size n associated with the user equipment $u_i$. The matrices $w_k, w_q, w_v$ are respectively named key weight matrices, query weight matrix and value weight matrix. These matrices may be the subject of learning (their elements being able to be assimilated with synaptic coefficients) by means of an objective function defined further.

Moreover, in the same way, the user equipment $u_j$ uses the matrices in question to calculate its own key, query and value weight vectors $k_j, q_j, v_j$.

The attention weights of the various user equipment $u_i \in V_j$ in relation to the user equipment $u_j$ are given by the respective scalar products of the key vectors of $u_i$ with the query vector of $u_j$, namely $q_j . k^T_j$. These scalar products are divided by $\sqrt{n}$ for stabilisation questions and subjected to a softmax calculation for normalisation. Ultimately the $N_j$ attention scores of user equipment $u_i \in V_j$ in relation to the user equipment $u_j$ are obtained:

$$\alpha_{i,j} = \mathrm{softmax}\left(\frac{q_i k_j^T}{\sqrt{n}}\right), u_i \in V_j \quad (8)$$

The score $\alpha_{i,j}$ expresses the degree of interaction of the user $u_i$ with the user $u_j$. Finally, the projected global observation vector, of dimension $_n$, is obtained, by means of a simple sum thus guaranteeing the transferability of the architecture (the variation in the number of users in the neighbourhood not changing the architecture of the neural network):

$$v_j(t) = g_w(o^g_j(t)) = \sum_{u_i \in V_j} \alpha_{i,j} v_i \quad (9)$$

According to a first alternative implementation, each user equipment calculates its triplet of key, query and value vectors then transmits it to the coordinating unit which calculates the projected global observation vectors and sends them back to the various users. The coordinating unit does not directly have access to the position information of the various users but only to the vectors in question.

According to a second variant, each user equipment calculates its key, query and value vectors and transmits them to its neighbours. A user equipment $u_j$ thus does not have access to the positions of its neighbours $u_i \in V_j$ but only to the vectors $k_i, q_i, v_i$.

The projected local observation vector, $u_j(t)=f_w(o^l_j(t))$, and that of the projected global observation, $v_j(t)=g_w(o^g_j(t))$ are subsequently combined in 320 by a combination function $h_w: \mathbb{R}^n \times \mathbb{R}^n \to \mathbb{R}^n$ to provide a code, $c_j(t)$ of the state $s_j(t)$ of the environment of the equipment $u_j: c_j(t)=h_w(u_j(t), v_j(t))$. For example, the combination function may be constructed according to a self-attention mechanism that weights, according to the context, the observables specific to the user and those relating to their environment:

$$c_j(t) = \beta_j^T \begin{bmatrix} u_j(t) \\ v_j(t) \end{bmatrix} \quad (10)$$

where $\beta_j$=softmax($u_j(t), v_j(t)$) is a line vector of size 2. In this way, a user may grant more or less attention to its local or global observation depending on whether it is more representative of its actual context. In this case, the local information of the user may be sufficient for their decision-making (for example, if they are alone in their cell, the perceived interference of the others then being negligible).

In a second phase, 330, the agent chooses the action $\alpha_j(t)$ to be carried out, from the code $c_j(t)$, estimated in the first phase, representing the state $s_j(t)$. The selection of the action (that is to say the base station chosen for the association) is carried out according to a configured strategy, $\pi_{w,j}(a|s_j)$, or in an equivalent manner $\pi_{w,j}(a|c_j)$ providing the probability of taking the action$_a$ when the agent is in the state $s_j$.

All of the operations represented in 312, 314, 320 and 335 are performed by a neural network of predetermined architecture and the set of parameters of which is no other than $_w$. In other words, the operations for projecting $f_w, g_w$ the local and global observation vectors, the combination operation $h_w$, as well as the obtaining of association probabilities $\pi_{w,j}(a|s_j)$ are performed by means of said neural network. It is important to note that due to the expression (9)

the calculation of the vector $v_j(t)$ is performed by simple adding up of the contributions of the various users in the neighbourhood and that consequently the size of the entry of the neural network is independent of the number of users in this neighbourhood.

The association strategy is determined during a preliminary training phase from experiments stored in memory of the various users $e_j(t)=(o_j(t), a_j(t), r(t), o_j(t+1))$ where $o_j(t)=(o^l_j(t), o^g_j(t))$, and by calculating updated reward sums $$G_j(t) = \sum_{\tau=1}^{T} \gamma^{\tau-1} r_j(t+\tau)$$

over episodes of length T, said strategy being obtained as that maximising $E_t(|G_j(t)|)$ where $E_t(\cdot)$ is the mathematical expectation taken on a set of experiments relating to the time t. The strategy from the training phase is a common strategy, $\pi_w$ which is stored in the meta model and is downloaded by the user equipment when they rejoin the network.

This common strategy is subsequently adapted/optimised by the agent depending on the evolution of the environment (non-stationary) of the user equipment. The adaptation is performed by means of a policy gradient method, in a manner known per se (cf. work of R. S. Sutton entitled "Reinforcement Learning", Chap. 13).

According to the so-called "Reinforce" method or its so-called PPO (Proximal Policy Optimisation) variant, the vector $W_t$ representing the parameters $_w$ at the time t is updated iteratively by:

$$w_{t+1} = w_t + \mu \hat{p}_t \qquad (11)$$

with $$\hat{p}_t = E_t\left(\frac{\nabla \pi_{w_t}(a_j | s_j)}{\pi_{w_{t-1}}(a_j | s_j)} \hat{A}_t(a_j | s_j)\right)$$

where $\mu$ is the learning rate, $\hat{p}_t = \nabla L(w)$ is the estimation of the gradient of the objective function $L(w) = E_t(\log \pi_{w_t}(a_j|s_j) \hat{A}_t(a_j|s_j))$ and $\hat{A}_t(a_j|s_j)$ is the advantage function at the time t, that is to say the difference between the Q-value of the action-state pair $(a_j, s_j)$ and the value function for the state $s_j$:

$$\hat{A}_t(a_j|s_j) = Q(s_j, a_j) - V(s_j) \qquad (12)$$

The person skilled in the art will understand that at each time or iteration t, the updating of the vector of the parameters is proportional to the advantage function to favour the actions that generate the greatest advantage and inversely proportional to the probability of the action to encourage the exploration of the least frequently selected actions.

The gradient of the objective function may be estimated by:

$$\hat{p}_t = E(\nabla \zeta(w_t) \hat{A}_t(a_j|s_j)) \qquad (13)$$

where $$\zeta(t) = \frac{\pi_{w_t}(a_j | s_j)}{\pi_{w_{t-1}}(a_j | s_j)}$$

is the ratio between the probability distribution at the current time t and the probability distribution at the preceding time.

The advantage function may be estimated for example from the temporal difference error $TD_{error}$:

$$\hat{A}_t(a_j|s_j) \approx r_j(t) + \gamma V(s_j') - V(s_j) \qquad (14)$$

Alternatively, the advantage function may be estimated from a generalised advantage estimation or GAE, as described for example in the article by J. Schulman et al. entitled "High-dimensional continuous control using generalised advantage estimation", ICLR 2016.

The method of the strategy gradient suffers from the variability of the gradient $|\hat{p}_t|$ that may lead to successive updates. It is then preferable to mark as absolute value the objective function by replacing in the expression (13) $\zeta(w_t)$ $\hat{A}_t(a_j|s_j)$ by an objective function, identified by clipping factors $1-\varepsilon_1$ for the negative updates ($\zeta(w_t)<1$) and $1-\varepsilon_2$ for the positive updates ($\zeta(w_t)>1$) with $0<\varepsilon_1<\varepsilon_2<1$, namely:

$$\min(\zeta(w_t)\hat{A}_t(a_j|s_j), \text{clip}(\zeta(w_t), 1-\varepsilon_1, 1-\varepsilon_2)\hat{A}_t(a_j|s_j)) \qquad (15)$$

with $\text{clip}(x,a,b) = \min(\max(x,a),b)$. The asymmetrical clipping factors aim to give greater importance to the updating of the parameters that improve the strategy than those that degrade it.

It should be noted that other methods for optimising the association strategy may alternatively be used, particularly the actor-critic methods with one or more steps (A2C, A3C, etc.)

Coming back to FIG. 3, the second phase 330 thus comprises an adaptation of the association strategy to the environment of the user equipment, represented in 335, as described above, following in 337 by a selection of the action according to the strategy thus updated. The selection of the action will be optimal in terms of improvement/exploration compromise when the actions chosen in the state $s_j$ will be so stochastically with the probabilities given by $\pi_{w_t}(a_j|s_j)$. Alternatively, it may be possible to opt for an $\varepsilon$-greedy selection, known per se (with $\varepsilon \in [0,1]$) wherein the action corresponding to the highest probability will be chosen in $1-\varepsilon$ of the cases and the other actions will be chosen randomly in $\varepsilon$ of the cases.

Various alternative implementations of the association method according to the invention may be envisaged depending on whether the various blocks of FIG. 3 are handled by the users or the coordinating unit.

Thus, in a completely centralised solution, the meta model (configured by the set of parameters w) is stored within the coordinating unit. The various user equipment transmit to the coordinating unit their pairs of respective observation vectors $o^l_j(t), o^g_j(t)$, or, more simply the pairs of vectors $(o^l_j(t), \tilde{o}^g_j(t))$ as defined above, or also the local observation vectors, $o^l_j(t)$, accompanied by the key, query and value weight vectors $k_j, q_j, v_j$. In this solution, the agents associated with the various equipment reside in the coordinating unit and the association decisions (actions) are transmitted to the users concerned. This solution has the advantage of not requiring the calculation resources of the various users at the expense however of a significant quantity of messages transmitted within the network.

In a completely distributed solution, on the other hand, each user possesses an instance of the meta model and evolves it independently from the value of the utility function (reward) transmitted to each iteration by the coordinating unit. Each user transmits to their neighbours their $k_j, q_j, v_j$ vectors obtained from their contribution $\tilde{o}^g_j(t)$ to the global observation vector $\tilde{o}v^g_j(t)$. This solution has the advantage of preserving the confidentiality so long as the various users do not transmit their positions to their neighbours. The quantity of messages transmitted within the network is also reduced (value of the utility function, for the main part).

A semi-distributed solution may also be envisaged, as represented in FIG. 3; wherein the coordinating unit (cell side) will be in charge of collecting the information necessary for constructing the global observation vectors and encoding them $g_w(o^g_j(t))$, if applicable by using an attention mechanism, according to the expressions (8) and (9).

Regardless of the solution retained, it will be understood that the various agents operate in parallel and asynchronously, as illustrated in FIG. 3.

FIG. 4 represents in flow chart form an example of implementation in a cellular network of a method for associating user equipment according to one embodiment.

In step 410, a new user equipment enters the network and desires to associate with a base station.

First, in 420, the user equipment forms its local observation vector and its global observation vector, the latter being encoded by means of an attention mechanism. The two vectors are combined to obtain an encoding of the state of the agent in the reference space.

Optionally in 430, the user equipment determines the radio conditions wherein it is found, for example the identifiers of the base stations likely to serve it, the RSSI levels of the signals received from these base stations, the interference level, etc.

In 440, the user equipment downloads an instance of the association meta model stored in the coordinating unit. The coordinating unit may have a single meta model or a plurality of meta models. In the event of a plurality of meta models, the coordinating unit may choose the relevant meta model depending on the radio conditions of the user equipment, of its quality of service (QoS) constraints, of the modulation and coding schema (MCS) used for the communication.

The downloaded model may subsequently evolve and be updated/optimised in 450 by the agent associated with the equipment of the user depending on its environment, as represented in the iterative loop. The association decision is subsequently made in 460 on the basis of the model thus updated.

Optionally, the agent associated with the user equipment may compare at regular intervals, or when it leaves the network, its updated model with the instance of meta model initially downloaded (and stored locally in the case of a distributed implementation). In the present case, a comparison at regular intervals has been represented in 470 in the iterative loop. Nevertheless, it should be noted that the comparison may only occur every P iterations.

The comparison between the updated model and initially downloaded model may be carried out for example by means of a Kullback-Leibler divergence metric $D_{KL}(\pi_w \| \pi_{w0})$:

$$D_{KL}(\pi_w \| \pi_{w0}) = \sum_{a_j} \sum_{s_j} \pi_w(a_j, s_j) \log \frac{\pi_w(a_j, s_j)}{\pi_{w0}(a_j, s_j)} \quad (16)$$

where $\pi_{w0}$ represents the strategy resulting from the meta model and $\pi_w$ represents the strategy resulting from the updated model.

When the metric $D_{KL}(\pi_w \| \pi_{w0})$ is greater in absolute value than a certain threshold in 480, the user equipment (or more generally its agent) provides in 485 the new set of parameters to the coordinating unit that may take it into account to update the meta model for example according to a federative learning method involving all of the agents.

The implementation of the association method ends in 495, when the agent determines in 490 that the user equipment leaves the network.

The invention claimed is:

1. A method for associating user equipment with base stations of a cellular network, the association method implementing a multi-agent reinforcement learning method, each user equipment being represented by an agent, comprising:
when a user equipment $u_j$ enters the network, downloading an instance of a meta model ($\pi_{w,0}$) to initialise an association strategy model ($\pi_{w,j}$) using the agent representing the user equipment, the meta model having an architecture independent of the user;
constructing a local observation vector ($o^l_j(t)$) comprising observables relating to the equipment and a global observation vector ($o^g_j(t)$) comprising observables relating to an environment of the equipment, using the agent representing the user equipment;
projecting the local observation vector and the global observation vector into the same reference space and combining the two vectors thus projected to provide a code ($c_j(t)$) of a state ($s_j(t)$) of the agent, using the agent representing the user equipment;
updating the association strategy model by means of a policy gradient method, using the agent representing the user equipment;
deciding on the base station with which to associate and receiving in return a common reward calculated from a utility function of the network, using the agent representing the user equipment.

2. The method for associating user equipment with base stations of a network according to claim 1, wherein the association strategy $\pi_{w,j}(a|s)$ gives the probability of taking the action $_a$ when the agent is in the state $_s$, the action $_a$ corresponding to an association with a base station of the network.

3. The method for associating user equipment with base stations of a network according to claim 1, wherein the local observation vector, $o^l_j(t)$, of the user $u_j$, at the time t comprises a decision to associate the agent at a preceding time, $a_j(t-1)$, in order to request the association of the user equipment $u_j$ with a base station, a response of the base station to this request, $ACK_j(t-1)$, a throughput required by the mobile terminal at the time t, $D_j(t)$, as well as an estimation of the capacity of a downlink of the base station with $u_j$ at the preceding time t−1, $R_j(t-1)$.

4. The method for associating user equipment with base stations of a network according to claim 3, wherein the global observation vector, $o^g_j(t)$, comprises coordinates of the user equipment located in a neighbourhood $V_j$ of $u_j$, as well as respective capacities of the downlinks between the user equipment and the base stations with which they are associated.

5. The method for associating user equipment with base stations of a network according to claim 4, wherein the global observation vector is projected into a reference space by means of an attention mechanism calculating for each contribution of a user $u_i \in V_j$ to the global observation vector, a key vector, $k_i$ a query vector, $q_i$, and a value vector, $v_i$, the method further comprising calculating for each user $u_i \in V_j$, an attention score $\alpha_{i,j}$ between the user and the user $u_j$, from a scalar product of the query vector of $u_i$ and of the key vector of $u_j$, the projected global observation vector being obtained as a linear combination of the respective value vectors, $v_i$, of the user equipment $u_i \in V_j$ weighted with corresponding attention scores, $\alpha_{i,j}$, the projection of the local and global observation vectors, the combination as well as the obtaining of the probabilities of association $\pi_{w,j}(a|s)$ with the various base stations of the network being performed by means of an artificial neural network initially configured from the instance of the meta model.

6. The method for associating user equipment with base stations of a network according to claim 5, wherein the local observation vector is projected into the reference space and the local and global observation vectors are combined by a self-attention mechanism to provide the code $(c_j(t))$ of the state $(s_i(t))$ of the agent.

7. The method for associating user equipment with base stations of a network according to claim 1, wherein the association strategy, $\pi_{w,j}(a|s)$ is configured by a set of parameters represented by a vector w, the vector being updated iteratively by $w_{i+1}=w_i+\mu\hat{p}_t$, where $\mu$ is a learning rate, and $\hat{p}_t=E(\nabla\zeta(w_t)\hat{A}_t(a_j|s_j))$ where $$\zeta(t) = \frac{\pi_{w_t}(a_j \mid s_j)}{\pi_{w_{t-1}}(a_j \mid s_j)}$$

is the ratio between a distribution of probability of taking the action $a_j$ in the state $s_j$ at the time t and the distribution of the same probability at the preceding time t−1, $\hat{A}_t(a_j|s_j)$ being the advantage function of the action $a_j$ in the state $s_j$ at the time t.

8. The method for associating user equipment with base stations of a network according to claim 1, wherein the association strategy, $\pi_{w,j}(a|s)$ is configured by a set of parameters represented by a vector $w$, the vector being updated iteratively by $w_{i+1}=w_i+\mu\hat{p}_t$ where $\mu$ is a learning rate, and $$\hat{p}_t=E(\nabla(\min(\zeta(w_t)\hat{A}_t(a_j|s_j),\text{clip}(\zeta(w_t),1-\epsilon_1,1-\epsilon_2)\cdot\hat{A}_j(a_j|s_j))))$$

with clip(x,a,b)=min(max(x,a),b) and $0<\epsilon_1<\epsilon_2<1$, and where $$\zeta(t) = \frac{\pi_{w_t}(a_j \mid s_j)}{\pi_{w_{t-1}}(a_j \mid s_j)}$$

is a ratio between a distribution of probability of taking the action $a_j$ in the state $s_j$ at the time t and the distribution of the same probability at the preceding time t−1, $\hat{A}_t(a_j|s_j)$ being the advantage function of the action $a_j$ in the state $s_j$ at the time t.

9. The method for associating user equipment with base stations of a network according to claim 1, comprising:
calculating a Kullback-Leibler divergence metric, $D_{KL}(\pi_w\|\pi_{w0})$, between the probability distribution, $\pi_w$, relating to the association strategy of the meta model and, $\pi_w$, relating to the strategy resulting from the updated module, and
transmitting to the coordinating unit the parameters of the updated model if this metric is greater in absolute value than a predetermined threshold using the agent representing the user equipment $u_j$.

10. The method for associating user equipment with base stations of a network according to claim 1, wherein the agents representing the user equipment reside in the coordinating unit, the equipment transmitting to the coordinating unit their local observation, $o^l_j(t)$, and global observation, $o^g_j(t)$, vectors and the association decisions of the various agents being transmitted by the coordinating unit to the latter.

11. The method for associating user equipment with base stations of a network according to claim 5, wherein the agents representing the user equipment reside in the coordinating unit, the equipment transmitting to the coordinating unit their local observation vectors, $o^l_j(t)$, accompanied by their key, query and value weight vectors $k_j,q_j,v_j$, the association decisions of the various agents being transmitted by the coordinating unit to the latter.

12. The method for associating user equipment with base stations of a cellular network according to claim 5, comprising exchanging between neighbours their key, query and value weight vectors $k_j,q_j,v_j$, the agents representing the various user equipment residing in the equipment and making the association decisions.

* * * * *